Dec. 16, 1930.  C. W. DAKE  1,785,184
DISTRIBUTION VALVE
Filed March 16, 1928  2 Sheets-Sheet 1

INVENTOR
Charles W. Dake
BY
Parker & Carter
ATTORNEYS.

Dec. 16, 1930.   C. W. DAKE   1,785,184
DISTRIBUTION VALVE
Filed March 16, 1928    2 Sheets-Sheet 2

INVENTOR
Charles W. Dake
BY
*Parker & Carter*
ATTORNEYS.

Patented Dec. 16, 1930

1,785,184

UNITED STATES PATENT OFFICE

CHARLES W. DAKE, OF CHICAGO, ILLINOIS, ASSIGNOR TO THE PYLE-NATIONAL COMPANY, OF CHICAGO, ILLINOIS, A CORPORATION OF NEW JERSEY

DISTRIBUTION VALVE

Application filed March 16, 1928. Serial No. 262,247.

My invention relates to improvements in distribution valves for steam engines and the like, and has for one object to provide a new and improved form of distribution valve wherein by the valve structure itself, without a change in the valve gear, it is possible to obtain both a main and an auxiliary cutoff. One object of the invention is to provide such a valve wherein the passages which provide the main and auxiliary cutoff effect are self-contained and renewable in the valve. Another object is to provide such passages so arranged as to prevent explosive effect. Another object is to provide an arrangement of passages to give major and minor cutoff wherein the supply of steam during the time between main cutoff and auxiliary cutoff will be substantially continuous and under accurate control. Other objects will appear from time to time in the specification.

My invention is illustrated more or less diagrammatically in the accompanying drawings, wherein Figure 1 shows a vertical section through the valve bushings with the piston in side elevation and in part section;

A is a crank end and $A^1$ the head end bushing. They are both ported at $A^2$. The valve chest which contains these bushings and holds them in proper position is not illustrated and forms no part of the invention. Suffice it to say that steam is admitted from the boiler into the space $A^3$ between the two bushings and travels through the bushings in the direction of the arrows X, being discharged outwardly to the engine in the direction of the arrows Y. The exhaust passes back through the ports $A^2$ and is discharged from the ends of the bushings in the direction of the arrows Z.

B is the valve stem provided with a shoulder $B^1$, upon which abuts the hub $B^2$ of a follower spider $B^3$, which spider is flanged to support and hold the bull ring $B^4$. At the head end of the stem there is no shoulder but a nut $B^5$ engages a similar follower spider $B^3$ with its bull ring $B^4$. $B^6$ $B^6$ are spools which support the inner ends of the bull rings and $B^7$ is the filler sleeve which joins the two spools. The nut $B^5$, when tightened up, exerts a longitudinal pressure upon the filler, the spools, the bull rings and the follower spiders to hold the piston valve together as a unit assembly.

Each bull ring $B^4$ has a packing ring C at the end, a packing ring $C^1$ intermediate the ends, and a relatively wide ring $C^2$ at the cutoff edge of the bull ring. The purpose of these packing rings is to provide a steam-tight connection between the piston and the bushing. It is obvious that if it were possible to build a piston the expansion and contraction of which, with respect to the bushing, was such under various conditions of heat that binding would not take place, the piston and bushing might be fitted so as to make the spring rings unnecessary. Primarily, then, the function of the spring rings is to bridge the necessary gap between the piston and the bushing. If the rings were dispensed with, or if they were integral with the piston, the cutoff edges formed by the rings would, of course, be formed in the piston body itself. The ring $C^2$ is provided on its inner periphery with an inwardly extending flange $C^3$ and is channeled about its entire outer periphery as at $C^4$, so as to provide in effect two packing ring elements engaging the bushing. The inner element $C^5$ provides the main cutoff edge. The outer element $C^6$ provides the auxiliary cutoff edge. The inner element $C^5$ is cut away as at $C^7$ to form a port or longitudinal channel which communicates on both sides with the channel $C^4$. All three of the rings are the ordinary type of spring rings split and expanding by their spring action against the inner periphery of the bushing to make a steam-tight fit between the valve and the bushing.

Figure 1:
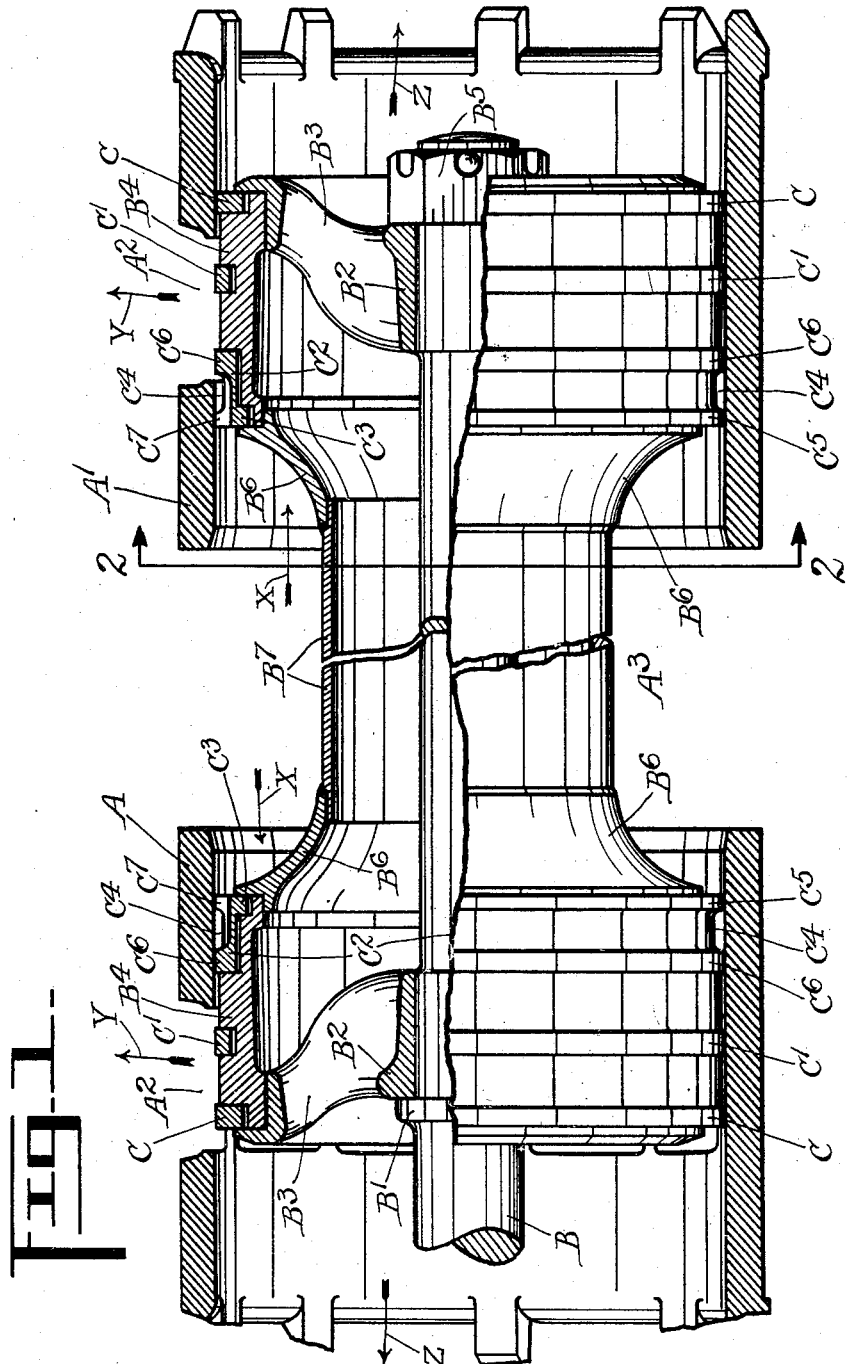
Figure 2:
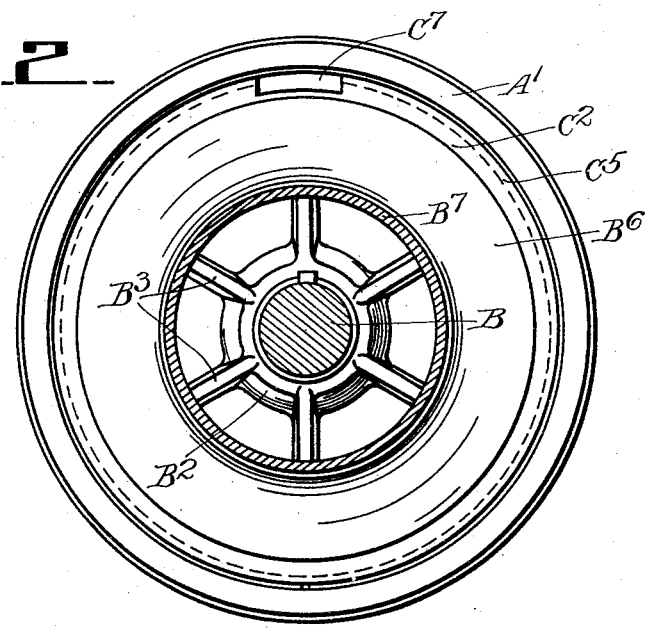
Figure 2 is a section along the line 2—2 of Fig. 1.
Figure 3:
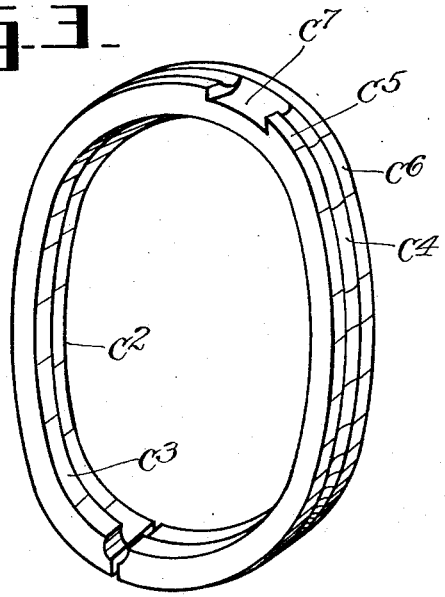
Figure 3 is a perspective view of one of the packing rings.

Considering the right-hand end of Fig. 1, and assuming that the piston, for instance, is moving toward the left, the main cutoff edge will have completed its traverse of the port $A^2$ and will have shut off the main steam supply. However, steam still passes through the port $C^7$ into the channel $C^4$ and out to the engine between the auxiliary cutoff edge and the edge of the port, and this continues until the cutoff edge has completed its traverse and the member $C^6$ has been brought into engagement with the bushing beyond the port. This arrangement permits the steam to circulate to some extent in the peripheral channel and makes the flow of steam during the time between main and auxiliary cutoff independent of the length of the channel $C^7$, and puts the control of the auxiliary supply of steam up to the auxiliary cutoff edge only. By this arrangement the part of the valve which is subjected to the most intense erosion of the steam, namely, that part over which the steam wipes during the time between main and auxiliary cutoff, is renewable without renewing the entire valve.

It will be understood that while I have used the term "cut-off" and "cut-off edge" in connection with the application of my invention to a distribution valve, that this term is primarily used as a descriptive term, and that my invention is equally applicable and intended so to be used in connection with any one of the fluid control edges of the valve.

I claim:

1. A distribution valve mechanism for steam engines and the like, comprising a ported bushing, a piston adapted to reciprocate therein, a spring ring mounted on the piston, a peripheral channel in the outer face of the ring, and a longitudinal channel extending through one side of the ring and joining the peripheral channel.

2. A distribution valve mechanism for steam engines and the like, comprising a ported bushing, a piston adapted to reciprocate therein, a spring ring mounted on the piston peripherally channeled to form on one side of the channel a main cutoff edge, on the other side an auxiliary cutoff edge, and a longitudinal channel through the main cutoff edge communicating with the peripheral channel.

3. A distribution valve mechanism for steam engines and the like, comprising a ported bushing, a piston adapted to reciprocate therein, a spring ring mounted on the piston, a peripheral channel in the outer face of the ring, and a longitudinal channel extending through one side of the ring and joining the peripheral channel, the spring ring being wider, measured in a direction parallel with the axis of the piston, than its thickness measured radially, and being interiorly flanged.

4. A distribution valve mechanism for steam engines and the like, comprising a ported bushing, a piston adapted to reciprocate therein, a spring ring mounted on the piston peripherally channeled to form on one side of the channel a main cutoff edge, on the other side an auxiliary cutoff edge, and a longitudinal channel through the main cutoff edge communicating with the peripheral channel, the spring ring being wider, measured in a direction parallel with the axis of the piston, than its thickness measured radially, and being interiorly flanged.

5. A distribution valve mechanism for steam engines and the like, comprising a ported bushing, a piston adapted to reciprocate therein having main and auxiliary cutoff edges, a peripheral channel interposed between said edges and a longitudinal channel extending through the main cutoff edge and communicating with said channel, the bottom of the channel being depressed below the face of the remainder of the piston where it contacts the bushing.

6. A distribution valve mechanism for steam engines and the like, comprising a ported bushing, a piston adapted to reciprocate therein having main and auxiliary cutoff edges, a peripheral channel interposed between said edges and a longitudinal channel extending through the main cutoff edge and communicating with said channel, the effective diameter of the piston at the channel being less than the effective diameter of the piston at the cutoff edges, the bottom of the channel being depressed below the face of the remainder of the piston where it contacts the bushing.

Signed at Chicago, county of Cook and State of Illinois, this 13th day of March, 1928.

CHARLES W. DAKE.